United States Patent
Ponukumati et al.

(10) Patent No.: US 9,210,691 B2
(45) Date of Patent: Dec. 8, 2015

(54) SYSTEM AND METHODS FOR COOPERATIVE NETWORK ACQUISITION ON A MULTI-SIM WIRELESS DEVICE

(71) Applicant: QUALCOMM Incorporated, San Diego, CA (US)

(72) Inventors: Dhananjaya Sarma Ponukumati, Hyderabad (IN); Ankammarao Ravuvari, Hyderabad (IN); Venugopal Krishna Srinivasa Srungaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 14/073,997

(22) Filed: Nov. 7, 2013

(65) Prior Publication Data

US 2015/0126187 A1    May 7, 2015

(51) Int. Cl.
| | |
|---|---|
| *H04W 4/00* | (2009.01) |
| *H04W 72/02* | (2009.01) |
| *H04W 48/18* | (2009.01) |
| *H04W 52/02* | (2009.01) |
| *H04W 16/14* | (2009.01) |
| *H04W 76/02* | (2009.01) |
| *H04W 88/06* | (2009.01) |

(52) U.S. Cl.
CPC ............. *H04W 72/02* (2013.01); *H04W 16/14* (2013.01); *H04W 48/18* (2013.01); *H04W 52/0245* (2013.01); *H04W 76/025* (2013.01); *H04W 88/06* (2013.01)

(58) Field of Classification Search
CPC ..... H04W 48/18; H04W 12/08; H04W 4/008; H04W 36/14; H04W 52/02; H04W 28/18; H04W 60/00; H04W 8/06; H04W 92/06; H04W 36/0066; H04W 60/005; H04W 8/265
USPC ......................................................... 455/434
See application file for complete search history.

(56) References Cited

U.S. PATENT DOCUMENTS 8,108,002 B2    1/2012  Lin
8,121,601 B2    2/2012  Huang et al.
(Continued)

FOREIGN PATENT DOCUMENTS

EP      2302971 A2    3/2011
WO   2012142166 A1   10/2012

OTHER PUBLICATIONS

International Search Report and Written Opinion—PCT/US2014/063749—ISA/EPO—Apr. 8, 2015.

*Primary Examiner* — Kwasi Karikari
(74) *Attorney, Agent, or Firm* — The Marbury Law Group, PLLC (57) ABSTRACT

Methods and devices are disclosed for enabling efficient service acquisition on multiple SIMs of a multi-SIM wireless communication device. After both SIMs have lost service, or after initial power up of the wireless device, the wireless device may detect radio frequency channels associated with wireless networks of all SIMs, and determine whether the strongest received radio frequency channel matches a preferred network of any SIM. Upon detecting a match, the wireless device may awaken that SIM and automatically camp that SIM on cell of the matched radio frequency channel. In this manner, the wireless device may avoid repetition typically involved in acquiring service on multiple SIMs.

32 Claims, 7 Drawing Sheets

(56) References Cited

U.S. PATENT DOCUMENTS

| | | |
|---|---|---|
| 8,195,234 B2 | 6/2012 | Chang et al. |
| 8,433,318 B2 | 4/2013 | Krishnamoorthy et al. |
| 2009/0088160 A1* | 4/2009 | Pani et al. ............... 455/436 |
| 2010/0203867 A1* | 8/2010 | Wu ........................ 455/414.1 |
| 2011/0269503 A1* | 11/2011 | Park et al. ............... 455/552.1 |
| 2012/0225651 A1* | 9/2012 | Rysgaard ................ 455/435.1 |
| 2012/0264425 A1* | 10/2012 | Krishnamoorthy et al. .. 455/434 |
| 2013/0005290 A1 | 1/2013 | Geary et al. |
| 2013/0012208 A1* | 1/2013 | Jeong .................... 455/435.3 |
| 2014/0120859 A1* | 5/2014 | Ekici et al. .............. 455/404.1 |
| 2014/0200048 A1* | 7/2014 | Cheng .................... 455/558 |

\* cited by examiner

SYSTEM AND METHODS FOR COOPERATIVE NETWORK ACQUISITION ON A MULTI-SIM WIRELESS DEVICE

BACKGROUND

Wireless communications devices may employ a variety of methods for achieving a network connection after initial power up or out-of-service conditions on the device. For example, a wireless device may scan the local wireless environment to detect radio frequencies corresponding to particular networks, and select suitable cells in those networks based on any of a number of prioritization factors (e.g., recency of use, preference set forth by the service provider, etc.) In a typical arrangement, a device may store a list of networks set by the service provider, a list of frequency bands supported by the device, and a list of channels within each supported band.

Multi-SIM wireless devices have become increasing popular because of their flexibility in service options and other features. One type of multi-SIM wireless device, a dual-SIM dual active (DSDA) device, allows simultaneous active connections with the networks corresponding to two SIMs. DSDA devices typically have separate transmit/receive chains associated with each SIM. Another type of multi-SIM wireless device, a dual-SIM dual standby (DSDS) device, allows selective communication on a first network while listening for pages on a second network.

In various types of multi-SIM wireless communication devices, each modem stack associated with a subscription may store information provisioned by its respective network operator, and may independently perform idle mode tasks required for cell selection and/or reselection. Consequently, each modem stack associated with a SIM may separately perform the same or redundant processes. These processes may include scanning the local wireless environment on frequencies of previously-acquired broadcast channels, scanning the local wireless environment on frequencies in supported bands, measuring signal strength on detected channels, and reading system information, including PLMN identifiers, on broadcast channels. Since each SIM may perform these tasks according to its own prioritization and configuration, system acquisition may be prolonged and power consumption may be increased.

SUMMARY

Systems, methods, and devices of the various embodiments enable a multi-SIM wireless communication device on which at least a first SIM and a second SIM are out-of-service to acquire service by gaining control of a radio resource by the first SIM, in which the radio resource is shared between the first and second SIMs, identifying available radio frequency (RF) channels that satisfy a signal strength threshold, ranking the identified RF channels, and determining whether the highest ranked RF channel belongs to a public land mobile network (PLMN) associated with the second SIM. Embodiment methods may also include, in response to determining that the highest ranked RF channel belongs to a PLMN associated with the second SIM, suspending acquisition on the first SIM, waking the second SIM from an idle mode, and automatically attempting acquisition of service on the highest ranked RF channel via the second SIM.

Embodiment methods may also include determining whether service on the highest ranked RF channel was successfully acquired via the second SIM, and camping the second SIM on the cell broadcasting the highest ranked RF channel in response to determining that service on the highest ranked RF channel was successfully acquired via the second SIM.

In other embodiment systems, methods and devices, determining whether the highest ranked RF channel belongs to a PLMN associated with a second SIM may include accessing a preferred PLMN list associated with the second SIM, identifying a first preferred PLMN in the preferred PLMN list associated with the second SIM, reading a PLMN identifier from a broadcast control channel (BCCH) on the highest ranked RF channel, and determining whether the PLMN identifier read from the BCCH matches the first preferred PLMN in the preferred PLMN list associated with the second SIM.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless device," and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM", "SIM card" and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device" "dual-SIM wireless communication device" "dual-SIM dual active device" and "DSDA device" are used interchangeably to describe a wireless device that is configured with more than one SIM and is capable of independently handling communications with networks of all subscriptions.

As used herein, the terms "wireless network," "cellular network," "system" "public land mobile network" and "PLMN" are used interchangeably to describe a wireless network of a carrier associated with a wireless device and/or subscription on a wireless device, and/or its roaming partners.

As used herein, the terms "cell," "beacon signal," "cell frequency," "BCCH carrier frequency" "BCCH channel," and "cell channel" are used interchangeably to describe a base frequency signal which a network broadcasts from a base transceiver station (BTS), radio base station (RBS), or node B in order to advertise its presence, operator identity, and other necessary initial information.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type networks, but may be applied to networks using any other radio technology or protocol.

A public land mobile network (PLMN) is communications network that is established by a wireless service carrier/service provider to provide land communication services to the public. When there are several PLMNs deployed in the same region, the areas covered by their networks may overlap. In typical wireless communications, a PLMN may operate on one or multiple frequency bands, and each wireless network within a PLMN may operate on one or more specific RF channels within a specific frequency band. Each RF channel is generally identified by a unique number, for example, an absolute radio frequency channel number (ARFCN) in a GSM PLMN. Each PLMN may support cells that use one or many different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology).

An example GSM network may operate on any of a number of GSM bands (e.g., GSM 900, GSM 850, etc.), each of which cover multiple radio frequency (RF) channels identified by ARFCNs The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band. In describing the various embodiments, the terms "channel," "frequency" and "ARFCN" may be used interchangeably and may refer to channels in GSM bands, and/or channels in other network bands (i.e., UARFCNs for UMTS networks, etc.).

A multi-SIM wireless device, which supports two or more SIM cards, may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-SIM dual standby" (DSDS) wireless device in which two SIMs share use of a single transceiver. Thus, in "dual standby mode," both SIMs are active, but while one SIM is transmitting or receiving data, the other SIM is unavailable for use. Other multi-SIM wireless communication devices may be configured to operate more than two SIMs in standby mode, thereby sharing a transceiver among at least three SIMs. The SIMs in a multi-SIM wireless communication device may be associated with the same or different PLMNs, each of which may have more than one wireless network. Each SIM is generally provisioned by a service provider with a list of preferred PLMNs from which it can receive service (i.e., a home PLMN and roaming partner PLMNs).

Although multi-SIM wireless communication devices offer a variety of options to the end user, they also necessitate efficient execution of complex tasks. In multi-SIM resource management, multiple SIMs may generally be handled separately with respect to out-of-service recovery and power-up scenarios. In particular, dual-SIM dual standby (DSDS) devices generally have separate modem stacks that share a radio, requiring the acquisition scans to be performed one at a time.

In operation, once powered on and/or recovering service, a conventional wireless device may scan the channels in a list of previously-acquired cell channels (i.e., Broadcast Control Channel (BCCH) carriers) that was stored in a local database or data table, along with previous signal strength measurements, based on the wireless device connection prior to shut down (or going out of service). If such a list is unavailable, the wireless device may scan and measure signal strength on the channels of each enabled frequency band, and may identify those channels that are above a threshold signal strength as being potential BCCH carriers. To determine whether a strong channel is a BCCH carrier, the wireless device may look to receive a frequency correction burst sent on a Frequency Correction Channel (FCCH). Upon detecting that a channel is a BCCH carrier, the wireless device typically tunes to the carrier frequency. On this frequency, the wireless device may read a Synchronization Channel (SCH) to obtain a base station identity code (BSIC), followed by reading the BCCH to obtain system information (e.g., a PLMN identifier). In this manner, the wireless device may identify available cells in its vicinity.

The conventional wireless device may also select a desired PLMN according to one of at least two modes. If the wireless device is in automatic mode, it typically selects a PLMN based on the preferred PLMN list, which may be specified by the manufacturer and/or home PLMN operator. If in manual mode, the user may be presented with a list containing all found PLMNs, and may select one from the list.

A conventional wireless device may attempt to find a suitable cell for camping by passing through the list in descending order of received signal strength, and the first BCCH carrier frequency which satisfies a set of requirements is selected. Such requirements include that the cell is part of the selected PLMN, the cell is not barred by the service provider, and the radio path loss between the mobile station and the selected base transceiver station is below a threshold set by the service provider. If the wireless device is unsuccessful in finding a cell to camp on using a list of previously-acquired BCCH carrier frequencies, the wireless device may repeat this process by scanning all channels in supported frequency bands.

While a multi-SIM wireless communication device may be configured to share resources among different SIMs, since communications may be implemented by separate modem stacks, this conventional process may be repeated for each SIM in order to successfully camp all SIMs on cells of their respective PLMNs.

In the various embodiments, acquisition of system information to allow cell service may be improved on a multi-SIM wireless communication device by cooperative PLMN searching. Specifically, instead of separately receiving radio signal information and searching for a particular PLMN, the various embodiments may utilize a combined radio frequency search from which it may be determined whether the PLMN of the overall strongest signal matches a preferred PLMN of any available SIM. If a preferred PLMN of a particular SIM is detected, the wireless device may trigger that SIM to wake up and automatically attempt acquisition on that channel. Therefore, the various embodiments provide energy- and time-efficient reuse of information by avoiding the repeated scans and searches normally associated with system acquisition using a shared radio resource. This cooperation among the SIMs implements an information-aware, context-aware approach to service acquisition and reacquisition to mitigate reacquisition delays. In this manner, the invention to be searched can provide the best acquisition attempt without being tied to the SIM that is currently active.

Further, in multi-SIM wireless communication devices in which SIMs are associated with different radio access technologies (RATs), the various embodiments may avoid delays resulting from searching for one type of network in an area where another type of network provides substantially better coverage. For example, in an area within a GSM cell but that is not within a WCDMA cell, a SIM with a WCDMA preferred PLMN may typically cycle through many WCDMA channels attempting to camp on a cell of its preferred PLMN, despite having found GSM channels matching a preferred PLMN of another SIM. Generally once the other SIM gains control of the radio resource it may not be provided with the information about such previously-discovered GSM PLMNs, and thus repeats the same steps The various embodiments may be implemented using a number of data structures and controls. In an embodiment, a joint acquisition database may be maintained in non-volatile memory of the wireless device. Such database may identify PLMNs for which any SIM on the device recently acquired a base frequency signal (i.e., BCCH carrier frequencies), as well as the frequency of the base frequency signal (i.e., the BCCH carrier frequency). Other information, such as the received signal strength measurement may also be stored in entries of the joint acquisition database. The joint acquisition database may assist the wireless device in quickly acquiring BCCH carrier frequencies by narrowing the number of frequencies on which to attempt service acquisition from many to a few likely candidates. Further, since the frequencies associated with or supported by two or more SIMs may overlap, a BCCH carrier frequency that was acquired on one of the SIMs may belong to a network of other SIMs on the device.

Figure 1:
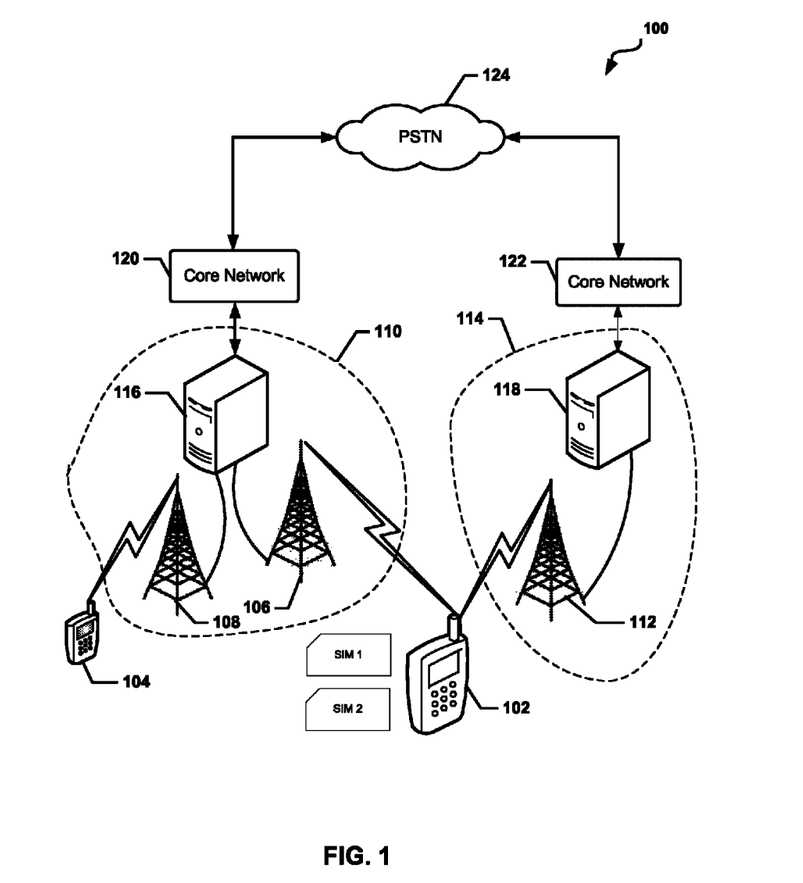
FIG. 1 is a communication system block diagram of a network suitable for use with the various embodiments.

FIG. 1 illustrates a wireless network system 100 suitable for use with the various embodiments. Wireless devices 102, 104 may be configured to establish wireless connections with cell towers or base stations of one or more radio access networks. For example, wireless devices 102, 104 may transmit/receive data using base stations 106, 108, which may be part of a network 110, as is known in the art. Wireless device 102 may further be configured to transmit/receive data through base station 112, which may be part of a different network 114.

The wireless networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, G-3, G-4, or other protocols that may be used in a wireless communications network or a data communications network. Networks 110, 114 may use the same or different wireless interfaces and/or physical layers. In an embodiment, base stations 106, 108, 112 may be controlled by one or more base station controllers (BSC) 116, 118. For example, base stations 106, 108, BSC 116, and other components may form network 110, as is known in the art. Alternate network configurations may also be used and the embodiments are not limited to the configuration illustrated. For example, in another embodiment the functionality of the BSC 116 and at least one of base stations 106, 108 may be collapsed into a single "hybrid" module having the functionality of these components.

In the various embodiments, a wireless device 102 may simultaneously access core networks 120, 122 after camping on cells managed by base stations 106, 112. Wireless device 102 may also establish connections with Wi-Fi access points, which may connect to the Internet. While the various embodiments are particularly useful with wireless networks, the embodiments are not limited to wireless networks and may also be implemented over wired networks with no changes to the methods.

In wireless network system 100, wireless device 102 may be a multi-SIM wireless communication device that is capable of operating on a plurality of SIMs. For example, the wireless device 102 may be a dual-SIM wireless communication device. Using dual-SIM functionality, the wireless device 102 may simultaneously access two core networks 120, 122 by camping on cells managed by base stations 106, 112. Core networks 120, 122 may be interconnected by public switched telephone network (PSTN) 124, across which the core networks 120, 122 may route various incoming and outgoing communications to the wireless device 102.

The wireless device 102 may make a voice or data call to a third party device, such as wireless device 104, using one of the SIMs. The wireless device 102 may also receive a voice call or other data transmission from a third party. The third party device (e.g., wireless device 104) may be any of a variety of devices, including, but not limited to, a mobile phone, laptop computer, PDA, server, etc.).

Some or all of the wireless devices 102 may be configured with multi-mode capabilities and may include multiple transceivers for communicating with different wireless networks over different wireless links/radio access technologies (RATs). For example, a wireless device 102 may be configured to communicate over multiple wireless data networks on different subscriptions, such as in a dual-SIM wireless device. In particular, a wireless device 102 may be configured with dual-SIM dual active (DSDA) capability, which enables a dual-SIM wireless communication device to simultaneously participate in two independent communications sessions, generally though independent transmit/receive chains.

For clarity, while the techniques and embodiments described herein relate to a wireless device configured with at least one CDMA subscription, they may be extended to subscriptions on other radio access networks (e.g., GSM, UMTS, WCDMA, LTE, etc.).

Figure 2:
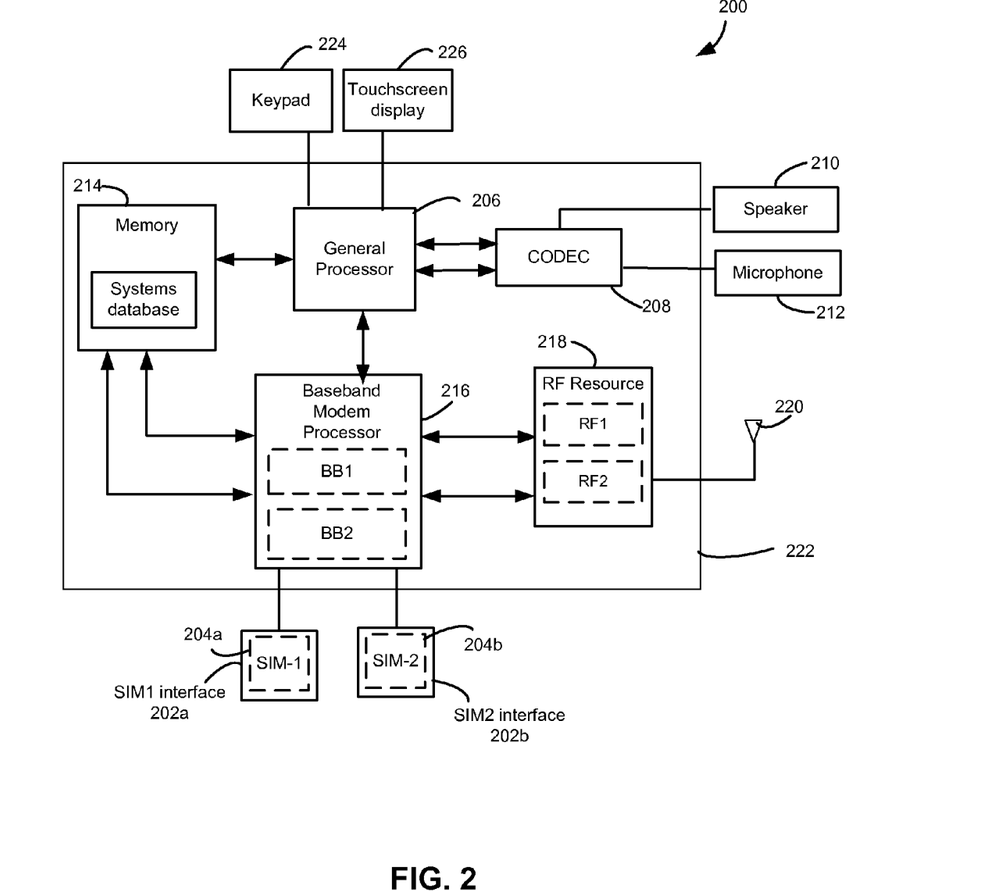
FIG. 2 is a block diagram illustrating a dual-SIM dual standby wireless communications device according to an embodiment.

FIG. 2 is a functional block diagram of a multi-SIM wireless device 200 that is suitable for implementing the various embodiments. Wireless device 200 may include a first SIM interface 202a, which may receive a first identity module SIM-1 204a that is associated with the first subscription. The wireless device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM card may further store home identifiers (e.g., a System Identification Number (SID)/Network Identification Number (NID) pair, a Home Public-Land-Mobile-Network (HPLMN) code, etc.) to indicate the SIM card network operator provider. An Integrated Circuit Card Identity (ICCID) SIM serial number may be printed on the SIM card for identification.

Wireless device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store a preferred PLMN list and a database of recently acquired PLMNs/BCCH carrier frequencies (i.e., a joint acquisition database), as described in further detail below with reference to FIGS. 4A and 4B.

The general processor 206 and memory 214 may each be coupled to at least one baseband modem processor 216. Each SIM in the wireless device 200 (e.g., SIM-1 202a and SIM-2 202b) may be associated with a baseband-RF resource chain. A baseband-RF resource chain may include baseband modem processor 216, which may perform baseband/modem functions for communications on at least one SIM, and may further include one or more amplifiers and radios, referred to generally herein as RF resource 218. RF resource 218 may perform transmit/receive functions for at least one SIM of the wireless device. In an embodiment, RF resource 218 may include separate transmit and receive circuitry, or may include a transceiver that combines transmitter and receiver functions. The RF resource 218 may be coupled to a wireless antenna (e.g., a first wireless antenna 220a and a second wireless antenna 220b.

In one embodiment, the wireless device 200 may have a common baseband-RF resource chain for all SIMs in the wireless device (i.e., a single baseband modem processor 216 and a single RF resource 218). In another embodiment, different SIMs may be associated with separate baseband-RF resource chains that include physically or logically separate RF resources (i.e., RF1, RF2), each of which may be coupled to a common baseband modem processor 216 (i.e., a single device that performs baseband/modem functions for all SIMs on the wireless device). Alternatively, different SIMs may be associated with separate baseband-RF resource chain that also include physically or logically separate baseband modem processors (e.g., BB1, BB2).

In a particular embodiment, the general processor 206, memory 214, baseband modem processor(s) 216, and RF resource 218 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in wireless device 200 to enable communication between them, as is known in the art.

Figure 3:
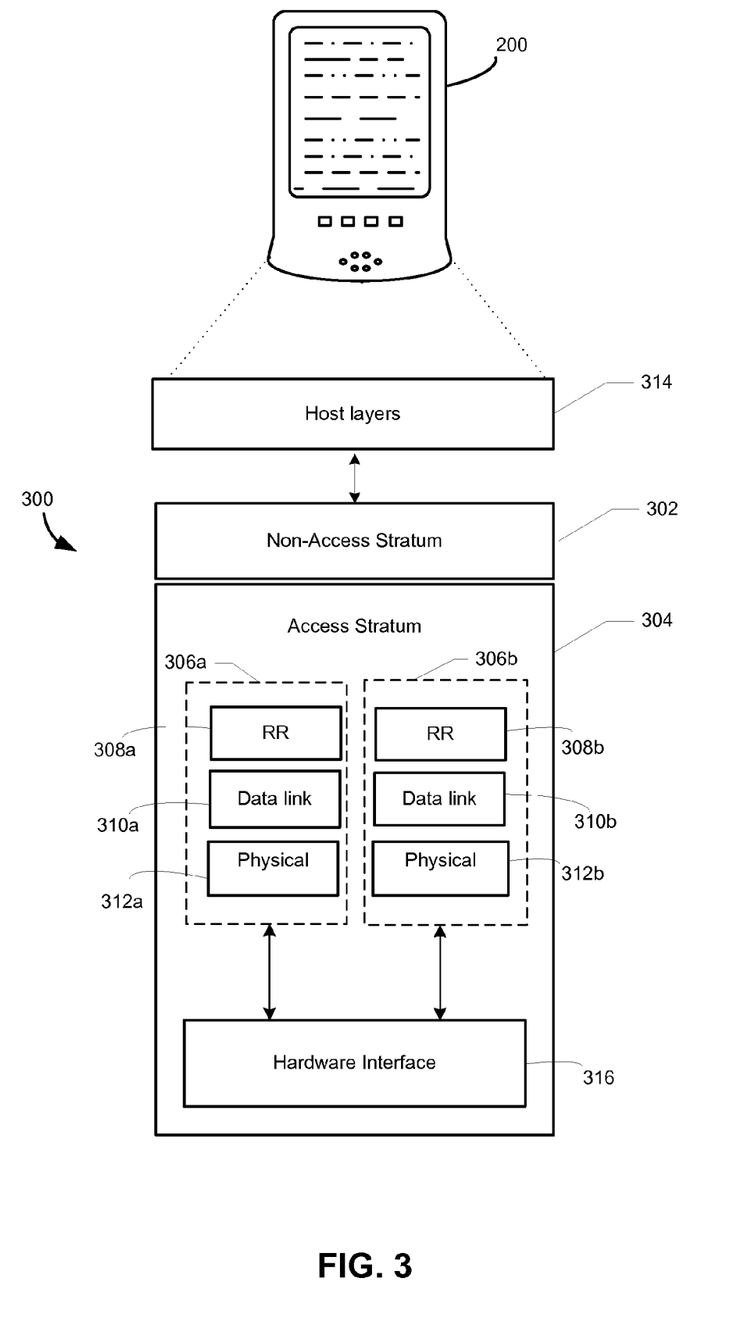
FIG. 3 is a block diagram illustrating example protocol layer stacks in a dual-SIM wireless communication device according to an embodiment.

Referring to FIG. 3, wireless device 200 may have a layered software architecture 300 to communicate over access networks associated with SIMs. The software architecture 300 may be distributed among one or more processors, such as baseband modem processor 216. The software architecture 300 may also include a Non Access Stratum (NAS) 302 and an Access Stratum (AS) 304. The NAS 302 may include functions and protocols to support traffic and signaling between SIMs of the wireless device 200 (e.g., SIM-1 204a, SIM-2 204b) and their respective core networks. The AS 304 may include functions and protocols that support communication between the SIMs (e.g., SIM-1 204a, SIM-2 204b) and entities of their respective access networks (such as a Mobile Switching Station (MSC) if in a GSM network).

In the multi-SIM wireless communication device 200, the AS 304 may include multiple protocol stacks, each of which may be associated with a different SIM. For example, the AS 304 may include stacks 306a, 306b, associated with SIMs 208a, 208b, respectively. Although described below with reference to GSM-type communication layers, protocol stacks 306a, 306b may support any of variety of standards and protocols for wireless communications. Each stack 306a, 306b may respectively include Radio Resource management (RR) layers 308a, 308b. The RR layers 308a, 308b may be part of Layer 3 of a GSM signaling protocol, and may oversee the establishment of a link between the wireless device 200 and associated access networks. In the various embodiments, the NAS 302 and RR layers 308a, 308b may perform the various functions to search for wireless networks (i.e., "scan") and to establish, maintain and terminate calls.

In an embodiment, each RR layer 308a, 308b may be one of a number of sub-layers of Layer 3. Other sub-layers may include, for example, connection management (CM) sub-layers (not shown) that route calls, select a service type, prioritize data, perform QoS functions, etc.

Residing below the RR layers 308a, 308b, protocol stacks 306a, 306b may also include data link layers 310a, 310b, which may be part of Layer 2 in a GSM signaling protocol. Data link layers 310a, 310b may provide functions to handle incoming and outgoing data across the network, such as dividing output data into data frames and analyzing incoming data to ensure it has been successfully received. In an embodiment, each data link layer 310a, 310b may contain various sub-layers (e.g., media access control (MAC) and logical link control (LLC) layers (not shown)). Residing below the data link layers 310a, 310b, protocol stacks 306a, 306b may also include physical layers 312a, 312b, which may establish connections over over the air interface and manage network resources for the wireless device 200.

While protocol stacks 306a, 306b provide functions to transmit data through physical media, the software architecture 300 may further include at least one host layer 314 to provide data transfer services to various applications in wireless device 200. In an embodiment, application-specific functions provided by the at least one host layer 314 may provide an interface between protocol stacks 306a, 306b and general processor 202. In an alternative embodiment, the protocol stacks 306a, 306b may each include one or more higher logical layers (e.g., transport, session, presentation, application, etc.) that provide host layer functions. In an embodiment, the software architecture 300 may further include in the the AS 304 a hardware interface 316 between physical layers 312a, 312b and the communication hardware (e.g., one or more RF transceivers).

In a multi-SIM wireless communication device that shares radio resources, a number of conditions may cause both SIMs to lose network connections. For example, an initial power-up procedure by the wireless device, out-of-service conditions in which all SIMs lose contact with current cells on which they were camped.

Conventionally, a wireless device may attempt to camp each SIM on its preferred SIM, which may be performed iteratively (i.e., SIM-1, SIM-2, . . . SIM-N). For example a wireless device may acquire BCCH carrier frequencies associated with the first SIM, select a suitable PLMN for SIM-1, determine which of the acquired frequencies advertise the selected PLMN, and choose an appropriate cell to camp on for the second SIM. The process may subsequently acquire BCCH carrier frequencies associated with the second SIM, determine the acquired frequencies that advertise the selected PLMN, and choose an appropriate cell to camp on for the second SIM, and may repeat this process for as many SIMs are configured on the wireless device.

Each SIM may be associated with a given set of frequency bands that are associated with PLMNs configured to support that particular SIM. The set of frequency bands for each SIM may be provided by the respective carriers for the SIMs of the device, and may be different, the same, or overlapping. "Acquisition" of BCCH carrier frequencies associated with a SIM may involve scanning a list of previously-acquired PLMNs and their BCCH carrier frequencies and/or scanning all frequency bands supported by the SIM and identifying channels above a threshold signal strength. Acquiring BCCH carrier frequencies may further include attempting to receive control channel information on the identified channels, for example, detecting a tone on a Frequency Correction Channel (FCCH), decoding a burst of a Synchronization Channel (SCH), and reading system information from a BCCH.

PLMN selection for each SIM may generally be performed according to a manual or automatic process. For example, the PLMN may be chosen according to a predefined order of priorities for selection. In some attachment procedures, the first SIM may select a PLMN by searching for PLMNs in a particular order (e.g., first CDMA, then EV-DO, etc.) and selecting the next highest PLMN in the predefined order that satisfies a threshold level of signal strength and/or cell quality. Once a PLMN is selected for the first SIM, the first SIM may attempt to camp on a cell by traversing the list of acquired channels in descending order of signal strength and selecting the first acquired channel/cell that is part of the selected PLMN.

Once the first SIM is able to camp on a cell of the PLMN, the PLMN selection process may be started for the second SIM. Similar to the first SIM, the radio may scan one or more frequency bands associated with the second SIM to acquire available PLMNs, or may attempt acquisition on a list of previously acquired channels.

Since this process may be repeated for each SIM, acquisition on the SIMs in a multi-SIM wireless communication device may introduce redundancy. For example, during channel acquisition/cell identification, the radio resource may scan frequency bands that overlap between the SIMs, and/or may attempt acquisition on frequencies from a power scan or on previously-acquired channels that were acquired on a different SIM.

The various embodiments provide time and energy efficient reuse of information by implementing a joint acquisition procedure for multiple SIMs that share a radio resource on wireless device. Specifically, a first SIM may obtain a list of identified frequencies, and instead of attempting to acquire (including identifying the PLMN of) each frequency to camp on one that matches a selected PLMN for the first SIM, the highest ranked frequency may be acquired (i.e., including PLMN identified). If the PLMN of the highest ranked frequency matches the PLMN of any of the multiple SIMs, the acquisition process for the first SIM may be suspended and the matching SIM may be triggered to camp on that frequency.

Figure 4A:
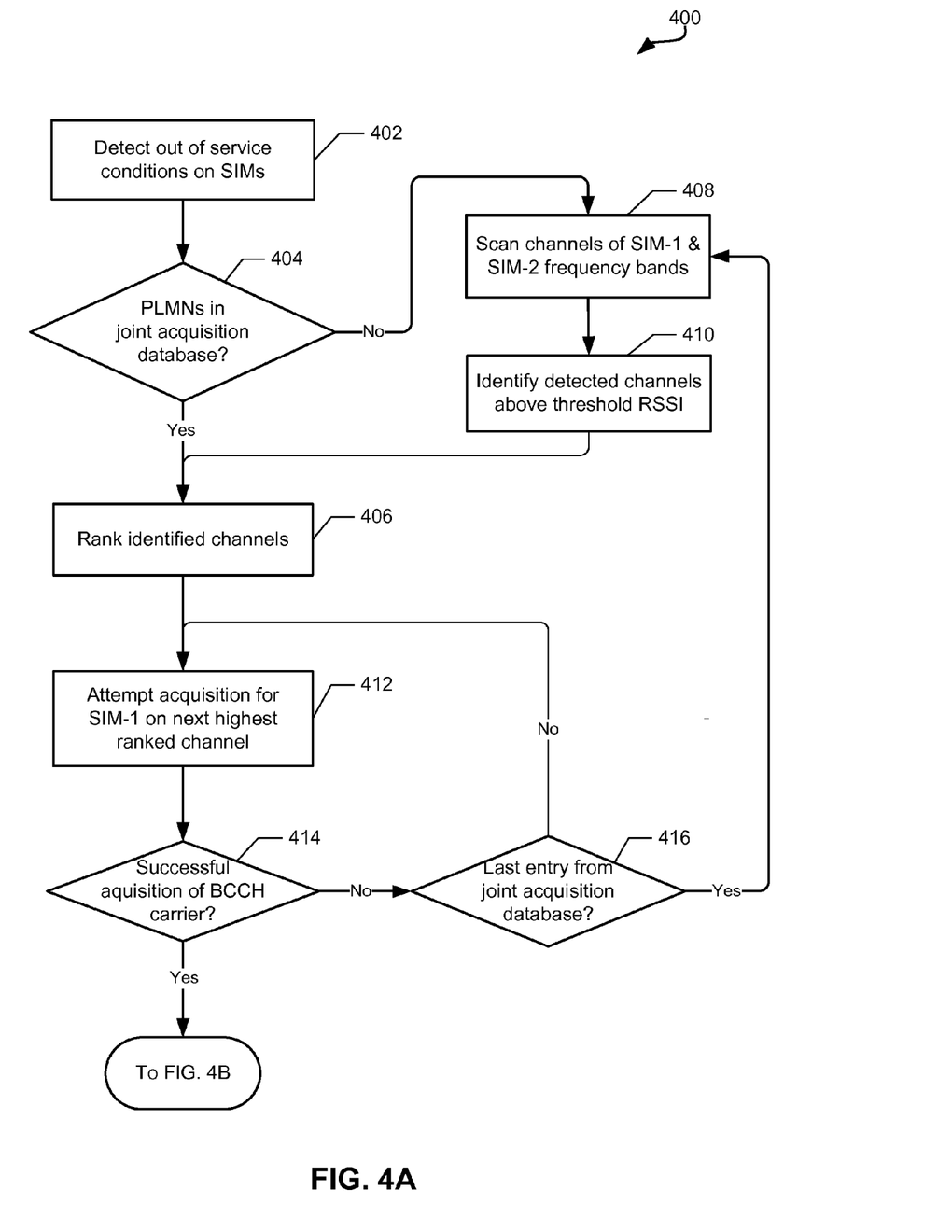
FIGS. 4A and 4B are process flow diagrams illustrating an embodiment method for cooperative cell acquisition in an example dual-SIM wireless communication device.

FIG. 4A illustrates an embodiment method 400 of joint acquisition on a multi-SIM wireless device, such as a dual-SIM dual standby (DSDS) device configured with a first SIM ("SIM-1") and a second SIM ("SIM-2"). The operations of method 400 may be implemented by one or more processors of the wireless device, such as the general processor 206 shown in FIG. 2, or a separate controller (not shown) that may be coupled to memory and to the baseband modem processor(s) 216.

In block 402, the wireless device processor may detect that the wireless device does not have a network connection on any of its available SIMs, such as due to an initial power-up of the device, or recovery from traveling into an out-of-service location for all current cells. To gain or regain service, a wireless device processor may begin cell identification to generate a combined list of received cell signals and their respective signal strengths.

In determination block 404, the wireless device processor may determine whether the wireless device has stored, such as in a joint acquisition database, a list identifying previously acquired PLMNs. The joint acquisition database may be accessible to all SIMs on a multi-SIM wireless communication device, and may send information to, and receive information from, the baseband-RF chain(s) 312 associated with the SIMs. In this manner, entries listing PLMNs that have been previously identified on BCCH carriers acquired by SIM-1 and/or SIM-2, as well as associated information (e.g., ARFCNs of BCCH carrier frequencies, received signal strength indicator (RSSI) measurements, etc.), may be saved for expediting future acquisition. The joint acquisition database may be limited to a maximum number of recent entries, which may be stored in a circular buffer so that each new entry may replace the oldest entry in the database. If the joint acquisition database has stored a list of previously identified PLMNs (i.e., determination block 404="Yes"), in block 406 the wireless device processor may rank the channels (e.g., ARFCNs) of the associated BCCH carrier frequencies for the PLMNs in order of measured signal strengths, such as by referring to their saved RSSI measurements.

If there are no entries saved in the joint acquisition database, such as because the wireless device is powered on for the first time, (i.e., determination block 404="No"), in block 408 the radio resource may perform a power scan of particular frequency bands to identify radio signals and measure their received signal strengths. In the various embodiments, the radio resource may scan the ARFCNs of the frequency bands associated with all of the SIMs on the device (e.g., SIM-1 and SIM-2).

As discussed above, a set of bands may be provisioned for each SIM by its carrier, and may be associated with PLMNs that are configured to support that particular SIM. In an embodiment, the frequency bands to be scanned may be determined by software and/or separate circuitry configured to perform acquisition control functions. In an example embodiment, a joint acquisition control module of the wireless device processor may access non-volatile memory associated with each SIM to identify the associated frequency bands (and the ARFCNs/channels in each band), and may develop a combined frequency list for scanning In another embodiment, the joint acquisition control module may maintain a combined frequency list by periodically querying each SIM and updating a joint list of channels/ARFCNs in advance. In block 410, the wireless device processor may generate a combined list of the identified channels/ARFCNs that have measured signal strengths above a particular threshold (e.g., for RSSI at least −85 dBm), and which may be ranked by signal strength in block 406, as described above.

In block 412, the wireless device processor may attempt acquisition on SIM-1 of the next highest ranked channel (i.e., the first ranked channel). As discussed above, acquisition may include decoding a system information message sent on a BCCH to obtain information, including a PLMN identifier. In an embodiment, acquisition may also include detecting a tone on a FCCH, decoding a burst on a SCH to obtain a base transceiver station identity code (BSIC) for the cell broadcasting the channel, and/or other criteria.

In determination block 414, the wireless device processor may determine whether SIM-1 successfully acquired the highest ranked channel. If SIM-1 did not successfully acquire the highest ranked channel (i.e., determination block 414="No"), in determination block 416, the wireless device processor may determine whether the unsuccessfully acquired channel was the last entry in a list of channels from the joint acquisition database. If the unsuccessfully acquired channel was not the last entry in the joint acquisition database (i.e., determination block 416="No") the process may return to block 412 to repeat attempting acquisition on the next highest ranked channel (i.e., the second ranked channel). If the unsuccessfully acquired channel was the last entry in a list from the joint acquisition database (i.e., determination block 416="Yes"), the process may return to block 408 to perform a power scan in order to identify channels in all of the frequency bands associated with either SIM-1 or SIM-2.

Figure 4B:
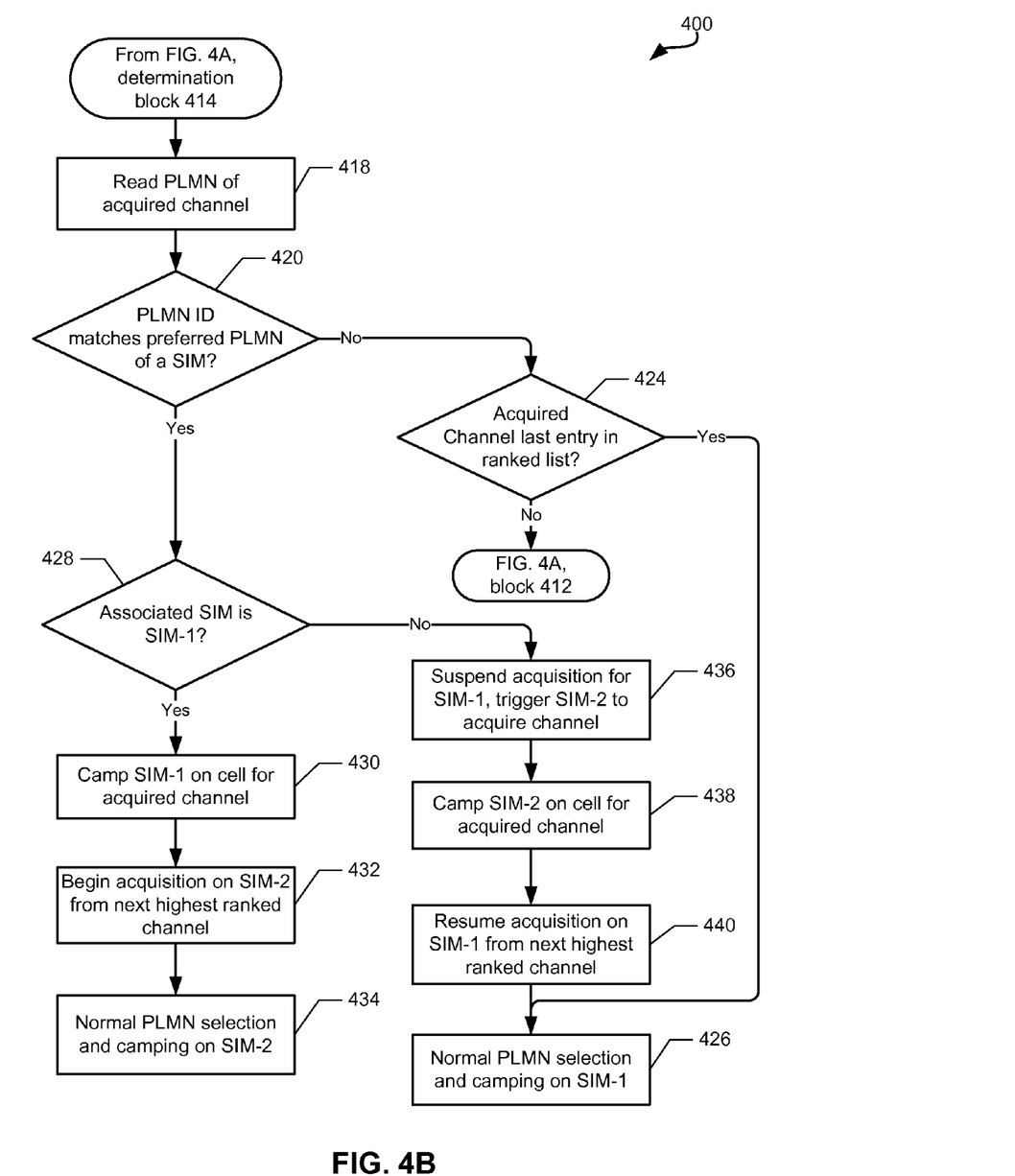

Referring now to FIG. 4B, which continues method 400, once SIM-1 successfully acquires the next highest ranked channel (i.e., determination block 414="Yes"), the wireless device processor may identify the PLMN of the acquired channel in block 418 from the decoded system information message read from the BCCH.

In determination block 420, the wireless device processor may determine whether the identified PLMN of the acquired channel matches a preferred PLMN associated with any SIM of the wireless device (i.e., SIM-1 or SIM-2). Preferred PLMNs associated with each SIM may be determined by accessing, for example, a preferred PLMN list that may be provisioned for each SIM by the respective home PLMN (HPLMN) operator, and identifying the first PLMN in that list. In an embodiment, the preferred PLMN may be the HPLMN, or another PLMN on which that SIM was most recently registered. Determination of whether the identified PLMN matches the preferred PLMN of a SIM may be performed, for example, by software and/or separate circuitry configured to perform acquisition control functions.

In an example embodiment, a joint acquisition control module of the wireless device processor may receive the PLMN identifier of the acquired channel, and may query a storage location associated with each SIM to read the first PLMN entry in each SIM's respective preferred PLMN list. In another embodiment, a joint acquisition control module of the wireless device processor may maintain a cache with the first PLMN entry in each SIM's respective preferred PLMN list, which may be periodically updated to account for any changes to the SIMs (e.g., PLMN updates over the air by the network operator, user's addition or removal of SIMs, etc.)

If the PLMN of the acquired ARFCN does not match the preferred PLMN associated with any SIM (i.e., determination block 420="No"), the wireless device processor may move to the next highest ranked channel for repeating the matching process. For example, in determination block 424, the wireless device processor may determine whether the acquired channel is the last entry from the ranked list. If the acquired channel is not the last in the ranked list (i.e., determination block 424="No"), the process may return to block 412 to attempt acquisition on the next highest ranked channel.

If the acquired frequency is the last frequency in the ranked list (i.e., determination block 424="Yes"), PLMN selection and camping on SIM-1 may proceed according to normal operations in block 426. For example, the wireless device processor may select a PLMN for SIM-1 according to a preferred PLMN list (i.e., automatic) or user selection (i.e., manual), and may traverse the list of acquired channels to select a suitable cell in that PLMN on which to camp SIM-1.

In an embodiment, following camping on a cell for SIM-1, normal PLMN selection and camping may proceed on remaining SIMs (i.e., SIM-2).

If the PLMN of the acquired channel matches the preferred PLMN associated with a SIM (i.e., determination block 420="Yes"), the wireless device processor may determine whether the associated SIM is SIM-1 in determination block 428. If the associated SIM is SIM-1 (i.e., determination block 428="Yes"), in block 430 the wireless device processor may camp SIM-1 on the acquired channel.

Once SIM-1 is successfully camped, the wireless device processor may begin acquisition on SIM-2 by traversing the list of remaining ranked channels (excluding the channel on which SIM-1 is camped) to identify PLMNs. In block 434 the wireless device processor may proceed with normal PLMN selection and camping on SIM-2. For example, the wireless device processor may select a suitable PLMN for SIM-2 and identify the next highest ranked channel that matches the selected PLMN, as well as other criteria.

If the associated SIM is not SIM-1 (i.e., determination block 428="No"), in block 436 the wireless device processor may automatically suspend the cell selection process for SIM-1, triggering SIM-2 to wake up and acquire the channel advertising its PLMN. In block 438 the wireless device processor may camp SIM-2 on the cell broadcasting that channel.

Once SIM-2 is successfully camped, the wireless device processor may resume acquisition on SIM-1 by traversing the list of remaining ranked channels (excluding the channel on which SIM-2 is camped) to identify PLMNs. In block 426, the wireless device processor may proceed with normal PLMN selection and camping on SIM-1. For example, the wireless device processor may select a suitable PLMN for SIM-1 and identify the next highest ranked channel that matches the selected PLMN, as well as other criteria.

As discussed above, the references to SIM-1 and SIM-2, as well as to a first network, second network, etc., are arbitrary, and may apply to either or any SIM and/or network of the wireless device.

Figure 5:
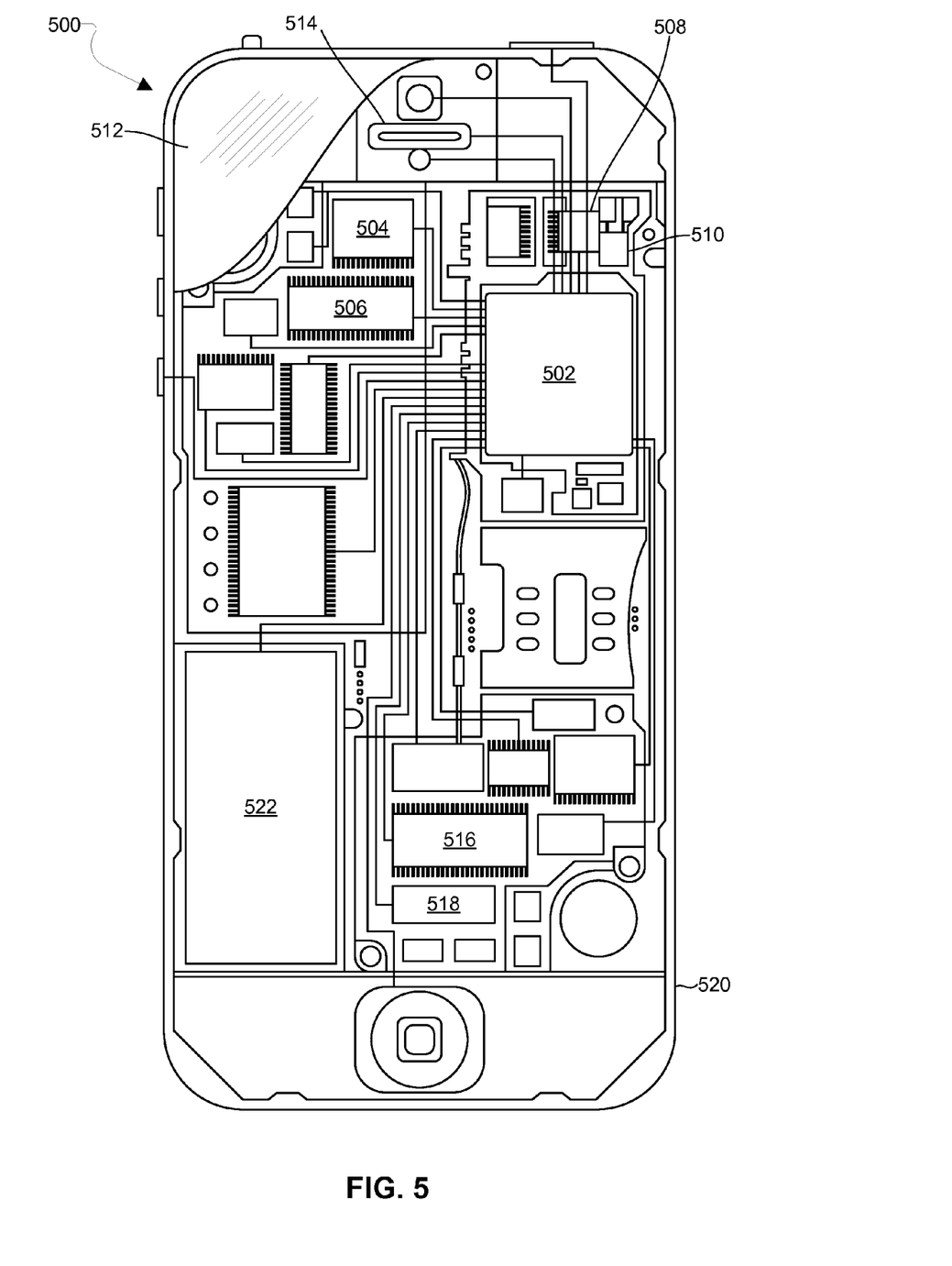
FIG. 5 is a component diagram of an example wireless device suitable for use with the various embodiments.

The various embodiments may be implemented in any of a variety of wireless devices, an example of which is illustrated in FIG. 5. For example, the wireless device 500 may include a processor 502 coupled to a touchscreen controller 504 and an internal memory 506. The processor 502 may be one or more multicore ICs designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The multicore device 500 may include a cellular network wireless modem chip 516 that enables communication via a cellular network and is coupled to the processor. The multicore device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The multicore device 500 may also include speakers 514 for providing audio outputs. The multicore device 500 may also include a housing 520, constructed of a plastic, metal, or a combination of materials, for containing all or some of the components discussed herein. The multicore device 500 may include a power source 522 coupled to the processor 502, such as a disposable or rechargeable battery. The rechargeable battery may also be coupled to the peripheral device connection port to receive a charging current from a source external to the multicore device 500.

Figure 6:
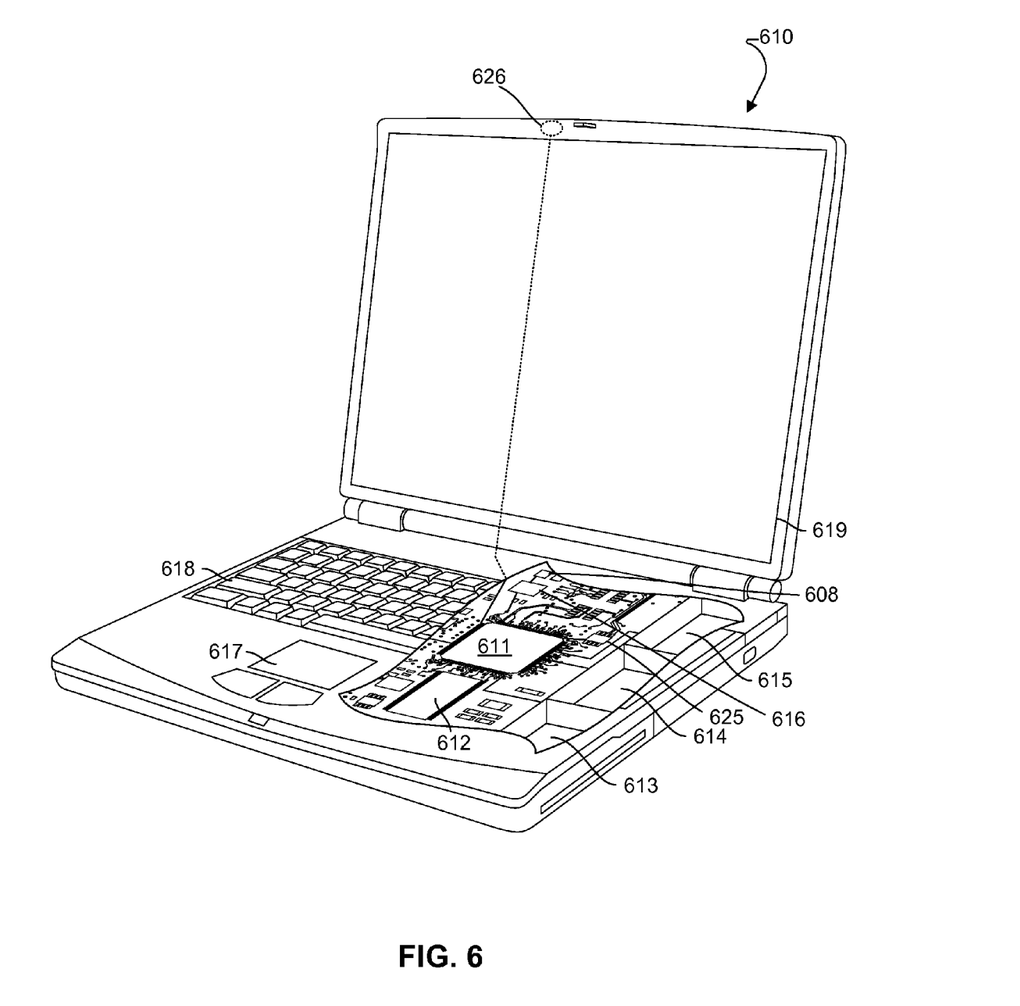
FIG. 6 is a component diagram of another example wireless device suitable for use with the various embodiments.

The various embodiments described above may also be implemented within a variety of personal computing devices, such as a laptop computer 600 as illustrated in FIG. 6. Many laptop computers include a touch pad touch surface 617 that serves as the computer's pointing device, and thus may receive drag, scroll, and flick gestures similar to those implemented on wireless computing devices equipped with a touch screen display and described above. A laptop computer 600 will typically include a processor 611 coupled to volatile memory 612 and a large capacity nonvolatile memory, such as a disk drive 613 of Flash memory. The computer 600 may also include a floppy disc drive 614 and a compact disc (CD) drive 615 coupled to the processor 611. The computer 600 may also include a number of connector ports coupled to the processor 611 for establishing data connections or receiving external memory devices, such as a USB or FireWire® connector sockets, or other network connection circuits for coupling the processor 611 to a network. In a notebook configuration, the computer housing includes the touchpad 617, the keyboard 618, and the display 619 all coupled to the processor 611. Other configurations of the computing device may include a computer mouse or trackball coupled to the processor (e.g., via a USB input) as are well known, which may also be use in conjunction with the various embodiments.

The processors 502 and 611 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of acquiring service on a multi-subscriber identification module (SIM) wireless device coupled to at least a first SIM and a second SIM, the method comprising:
   gaining control of a radio resource by the first SIM, wherein the radio resource is shared between the first and second SIMs;
   identifying available radio frequency (RF) channels that satisfy a signal strength threshold;
   ranking the identified RF channels;
   determining whether a highest ranked RF channel belongs to a public land mobile network (PLMN) associated with the second SIM;
   in response to determining that the highest ranked RF channel belongs to a PLMN associated with the second SIM:
      suspending acquisition on the first SIM;
      waking the second SIM from an idle mode; and
      automatically attempting acquisition of service on the highest ranked RF channel via the second SIM; and
   performing normal PLMN selection and camping for the first and second SIMs in response to determining that the highest ranked RF channel does not belong to a PLMN associated with the second SIM.

2. The method of claim 1, further comprising:
   determining whether service on the highest ranked RF channel was successfully acquired via the second SIM; and
   camping the second SIM on a cell broadcasting the highest ranked RF channel in response to determining that service on the highest ranked RF channel was successfully acquired via the second SIM.

3. The method of claim 2, further comprising resuming acquisition on the first SIM in response to determining that service on the highest ranked RF channel was successfully acquired via the second SIM, wherein resuming acquisition comprises omitting the RF channel on which the second SIM is camped.

4. The method of claim 1, further comprising:
   determining whether the highest ranked RF channel belongs to a PLMN associated with the first SIM; and
   camping the first SIM on a cell broadcasting the highest ranked RF channel in response to determining that the highest ranked RF channel belongs to a PLMN associated with the first SIM.

5. The method of claim 1, wherein determining whether the highest ranked RF channel belongs to a PLMN associated with the second SIM comprises:
   accessing a preferred PLMN list associated with the second SIM; and
   identifying a first preferred PLMN in the preferred PLMN list associated with the second SIM;

reading a PLMN identifier from a broadcast control channel (BCCH) on the highest ranked RF channel; and
determining whether the PLMN identifier read from the BCCH matches the first preferred PLMN in the preferred PLMN list associated with the second SIM.

6. The method of claim 1, wherein identifying available RF channels that satisfy a signal strength threshold comprises identifying available RF channels that satisfy a signal strength threshold based on an acquisition database, wherein the acquisition database contains entries comprise:
PLMN identifiers corresponding to RF channels previously acquired on the first SIM and the second SIM;
absolute radio frequency channel numbers (ARFCNs) of the previously acquired RF channels; and
signal strength measurements of the previously acquired RF channels.

7. The method of claim 1, wherein identifying available RF channels that satisfy a signal strength threshold comprises:
performing a power scan on all available frequency bands; and
identifying, within the frequency bands, RF channels that satisfy a predetermined minimum radio signal strength indicator (RSSI) value.

8. The method of claim 7, wherein performing a power scan on all available frequency bands comprises:
identifying supported frequency bands associated with the first SIM;
identifying supported frequency bands associated with the second SIM; and
generating a combined list of available frequency bands, wherein the combined list is accessible to the first and second SIMs.

9. A wireless device, comprising:
a radio resource shared between a first subscriber identification module (SIM) and a second SIM; and
a processor coupled to the radio resource, wherein the processor is configured with processor-executable instructions to:
gain control of the radio resource by the first SIM;
identify available radio frequency (RF) channels that satisfy a signal strength threshold;
rank the identified RF channels;
determine whether a highest ranked RF channel belongs to a public land mobile network (PLMN) associated with the second SIM;
in response to determining that the highest ranked RF channel belongs to a PLMN associated with the second SIM:
suspend acquisition on the first SIM;
wake the second SIM from an idle mode; and
automatically attempt acquisition of service on the highest ranked RF channel via the second SIM; and
perform normal PLMN selection and camping for the first and second SIMs in response to determining that the highest ranked RF channel does not belong to a PLMN associated with the second SIM.

10. The wireless device of claim 9, wherein the processor is further configured with processor-executable instructions to:
determine whether service on the highest ranked RF channel was successfully acquired via the second SIM; and
camp the second SIM on a cell broadcasting the highest ranked RF channel in response to determining that service on the highest ranked RF channel was successfully acquired via the second SIM.

11. The wireless device of claim 10, wherein the processor is further configured with processor-executable instructions to resume acquisition on the first SIM in response to determining that service on the highest ranked RF channel was successfully acquired via the second SIM, wherein resuming acquisition comprises omitting the RF channel on which the second SIM is camped.

12. The wireless device of claim 9, wherein the processor is further configured with processor-executable instructions to:
determine whether the highest ranked RF channel belongs to a PLMN associated with the first SIM; and
camp the first SIM on a cell broadcasting the highest ranked RF channel in response to determining that the highest ranked RF channel belongs to a PLMN associated with the first SIM.

13. The wireless device of claim 9, wherein the processor is further configured with processor-executable instructions to determine whether the highest ranked RF channel belongs to a PLMN associated with the second SIM by:
accessing a preferred PLMN list associated with the second SIM; and
identifying a first preferred PLMN in the preferred PLMN list associated with the second SIM;
reading a PLMN identifier from a broadcast control channel (BCCH) on the highest ranked RF channel; and
determining whether the PLMN identifier read from the BCCH matches the first preferred PLMN in the preferred PLMN list associated with the second SIM.

14. The wireless device of claim 9, wherein the processor is further configured with processor-executable instructions to identify available RF channels that satisfy a signal strength threshold based on an acquisition database, wherein the acquisition database contains entries that comprise:
PLMN identifiers corresponding to RF channels previously acquired on the first SIM and the second SIM;
absolute radio frequency channel numbers (ARFCNs) of the previously acquired RF channels; and
signal strength measurements of the previously acquired RF channels.

15. The wireless device of claim 9, wherein the processor is further configured with processor-executable instructions to identify available RF channels that satisfy a signal strength threshold by:
performing a power scan on all available frequency bands; and
identifying, within the frequency bands, RF channels that satisfy a predetermined minimum radio signal strength indicator (RSSI) value.

16. The wireless device of claim 15, wherein the processor is further configured with processor-executable instructions to perform a power scan on all available frequency bands by:
identifying supported frequency bands associated with the first SIM;
identifying supported frequency bands associated with the second SIM; and
generating a combined list of available frequency bands, wherein the combined list is accessible to the first and second SIMs.

17. A wireless device, comprising:
means for gaining control of a radio resource by a first subscriber identification module (SIM) and a second SIM, wherein the radio resource is shared between the first SIM and a second SIM;
means for identifying available radio frequency (RF) channels that satisfy a signal strength threshold;
means for ranking the identified RF channels;
means for determining whether a highest ranked RF channel belongs to a public land mobile network (PLMN) associated with the second SIM;

means for suspending acquisition on the first SIM, waking the second SIM from an idle mode, and automatically attempting acquisition of service on the highest ranked RF channel via the second SIM in response to determining that the highest ranked RF channel belongs to a PLMN associated with the second SIM; and means for performing normal PLMN selection and camping for the first and second SIMs in response to determining that the highest ranked RF channel does not belong to a PLMN associated with the second SIM.

18. The wireless device of claim 17, further comprising:
means for determining whether service on the highest ranked RF channel was successfully acquired via the second SIM; and
means for camping the second SIM on a cell broadcasting the highest ranked RF channel in response to determining that service on the highest ranked RF channel was successfully acquired via the second SIM.

19. The wireless device of claim 18, further comprising:
means for resuming acquisition on the first SIM in response to determining that service on the highest ranked RF channel was successfully acquired via the second SIM, wherein means for resuming acquisition comprises means for omitting the RF channel on which the second SIM is camped.

20. The wireless device of claim 17, further comprising:
means for determining whether the highest ranked RF channel belongs to a PLMN associated with the first SIM; and
means for camping the first SIM on a cell broadcasting the highest ranked RF channel in response to determining that the highest ranked RF channel belongs to a PLMN associated with the first SIM.

21. The wireless device of claim 17, wherein means for determining whether the highest ranked RF channel belongs to a PLMN associated with the second SIM comprises:
means for accessing a preferred PLMN list associated with the second SIM; and
means for identifying a first preferred PLMN in the preferred PLMN list associated with the second SIM;
means for reading a PLMN identifier from a broadcast control channel (BCCH) on the highest ranked RF channel; and
means for determining whether the PLMN identifier read from the BCCH matches the first preferred PLMN in the preferred PLMN list associated with the second SIM.

22. The wireless device of claim 17, wherein means for identifying available RF channels that satisfy a signal strength threshold comprises means for identifying available RF channels that satisfy a signal strength threshold based on an acquisition database, wherein the acquisition database contains entries comprise:
PLMN identifiers corresponding to RF channels previously acquired on the first SIM and the second SIM;
absolute radio frequency channel numbers (ARFCNs) of the previously acquired RF channels; and
signal strength measurements of the previously acquired RF channels.

23. The wireless device of claim 19, wherein means for identifying available RF channels that satisfy a signal strength threshold comprises:
means for performing a power scan on all available frequency bands; and
means for identifying, within the frequency bands, RF channels that satisfy a predetermined minimum radio signal strength indicator (RSSI) value.

24. The wireless device of claim 23, wherein means for performing a power scan on all available frequency bands comprises:
means for identifying supported frequency bands associated with the first SIM;
means for identifying supported frequency bands associated with the second SIM; and
means for generating a combined list of available frequency bands, wherein the combined list is accessible to the first and second SIMs.

25. A non-transitory computer-readable medium having stored thereon processor-executable instructions configured to cause a processor of a wireless device to perform operations comprising:
gaining control of a radio resource by a first subscriber identification module (SIMS), wherein the radio resource is shared between the first SIM and a second SIM;
identifying available radio frequency (RF) channels that satisfy a signal strength threshold;
ranking the identified RF channels;
determining whether a highest ranked RF channel belongs to a public land mobile network (PLMN) associated with the second SIM; and
in response to determining that the highest ranked RF channel belongs to a PLMN associated with the second SIM:
suspending acquisition on the first SIM;
waking the second SIM from an idle mode; and
automatically attempting acquisition of service on the highest ranked RF channel via the second SIM; and
performing normal PLMN selection and camping for the first and second SIMs in response to determining that the highest ranked RF channel does not belong to a PLMN associated with the second SIM.

26. The non-transitory computer-readable medium of claim 25, wherein the stored processor-executable instructions are configured to cause the wireless device processor to perform operations further comprising:
determining whether service on the highest ranked RF channel was successfully acquired via the second SIM; and
camping the second SIM on a cell broadcasting the highest ranked RF channel in response to determining that service on the highest ranked RF channel was successfully acquired via the second SIM.

27. The non-transitory computer-readable medium of claim 26, wherein the stored processor-executable instructions are configured to cause the wireless device processor to perform operations further comprising resuming acquisition on the first SIM in response to determining that service on the highest ranked RF channel was successfully acquired via the second SIM, wherein resuming acquisition comprises omitting the RF channel on which the second SIM is camped.

28. The non-transitory computer-readable medium of claim 25, wherein the stored processor-executable instructions are configured to cause the wireless device processor to perform operations further comprising:
determining whether the highest ranked RF channel belongs to a PLMN associated with the first SIM; and
camping the first SIM on a cell broadcasting the highest ranked RF channel in response to determining that the highest ranked RF channel belongs to a PLMN associated with the first SIM.

29. The non-transitory computer-readable medium of claim 25, wherein the stored processor-executable instructions are configured to cause the wireless device processor to perform operations such that determining whether the highest ranked RF channel belongs to a PLMN associated with the second SIM comprises:

accessing a preferred PLMN list associated with the second SIM; and     identifying a first preferred PLMN in the preferred PLMN list associated with the second SIM;

reading a PLMN identifier from a broadcast control channel (BCCH) on the highest ranked RF channel; and     determining whether the PLMN identifier read from the BCCH matches the first preferred PLMN in the preferred PLMN list associated with the second SIM.

30. The non-transitory computer-readable medium of claim 25, wherein the stored processor-executable instructions are configured to cause the wireless device processor to perform operations such that identifying available RF channels that satisfy a signal strength threshold comprises identifying available RF channels that satisfy a signal strength threshold based on an acquisition database, wherein the acquisition database contains entries comprise:

PLMN identifiers corresponding to RF channels previously acquired on the first SIM and the second SIM;

absolute radio frequency channel numbers (ARFCNs) of the previously acquired RF channels; and     signal strength measurements of the previously acquired RF channels.

31. The non-transitory computer-readable medium of claim 25, wherein the stored processor-executable instructions are configured to cause the wireless device processor to perform operations such that identifying available RF channels that satisfy a signal strength threshold comprises:

performing a power scan on all available frequency bands; and     identifying, within the frequency bands, RF channels that satisfy a predetermined minimum radio signal strength indicator (RSSI) value.

32. The non-transitory computer-readable medium of claim 31, wherein the stored processor-executable instructions are configured to cause the wireless device processor to perform operations such that performing a power scan on all available frequency bands comprises:

identifying supported frequency bands associated with the first SIM;

identifying supported frequency bands associated with the second SIM; and     generating a combined list of available frequency bands, wherein the combined list is accessible to the first and second SIMs.

\* \* \* \* \*